United States Patent
Lielbriedis

(10) Patent No.: US 6,738,636 B2
(45) Date of Patent: May 18, 2004

(54) METHOD FOR PROVIDING ACCESS TO DATA

(75) Inventor: Aleksander Lielbriedis, Hässelby (SE)

(73) Assignee: Microsoft Corporation, Redmond, WA (US)

( * ) Notice: Subject to any disclaimer, the term of this patent is extended or adjusted under 35 U.S.C. 154(b) by 441 days.

(21) Appl. No.: 09/834,299

(22) Filed: Apr. 12, 2001

(65) Prior Publication Data

US 2001/0051528 A1 Dec. 13, 2001

(30) Foreign Application Priority Data

Apr. 19, 2000 (SE) ............................................. 0001456
Sep. 26, 2000 (SE) ............................................. 0003434

(51) Int. Cl.[7] ............................................. H04Q 7/20
(52) U.S. Cl. ....................... 455/466; 455/413; 455/412.1
(58) Field of Search ..................... 455/412.2, 412.1, 455/466, 426.1, 413

(56) References Cited

U.S. PATENT DOCUMENTS

| | | | | |
|---|---|---|---|---|
| 6,101,393 A | * | 8/2000 | Alperovich et al. | 455/466 |
| 6,122,523 A | * | 9/2000 | Zicker et al. | 455/551 |
| 6,298,231 B1 | * | 10/2001 | Heinz | 455/413 |
| 6,415,156 B1 | * | 7/2002 | Stadelmann | 455/466 |
| 6,519,234 B1 | * | 2/2003 | Werkander | 370/328 |
| 6,535,586 B1 | * | 3/2003 | Cloutier et al. | 379/88.13 |
| 6,587,693 B1 | * | 7/2003 | Lumme et al. | 455/466 |
| 2001/0034225 A1 | * | 10/2001 | Gupte et al. | 455/412 |
| 2001/0047343 A1 | * | 11/2001 | Dahan et al. | 705/76 |
| 2002/0098855 A1 | * | 7/2002 | Hartmaier et al. | 455/466 |

* cited by examiner

Primary Examiner—William Trost
Assistant Examiner—Sharad Rampuria
(74) Attorney, Agent, or Firm—Workman Nydegger

(57) ABSTRACT

Short messages, of the kind by a digital radio communication network, are used in connection with providing access to stored digital data over the digital radio communication network. Information identifying a piece of data stored by an application is first transmitted to, and later received from, a mobile communication station by using the address data space of short messages transmitted between the application and the mobile communication station.

20 Claims, 2 Drawing Sheets

METHOD FOR PROVIDING ACCESS TO DATA

TECHNICAL FIELD

The present invention relates to use of short messages, of the kind provided by a digital radio communication network, in connection with providing access to stored digital data over the digital radio communication network.

BACKGROUND OF THE INVENTION

Today there exist a number of examples of message based services that are provided in accordance with certain standards in digital communication systems. Examples of such services are SMS (Short Message Service) and USSD (Unstructured Supplementary Service Data) in the digital radio communication network GSM. Similar message based services exists, or will exist, in other existing or future digital radio communication networks, such as GPRS, CDMA, D-AMPS (IS-136), PDC (Pacific Digital Cellular), W-CDMA (Wideband Code Division Multiple Access) and UMTS/IMT-2000.

These message based services of different digital radio communication networks are normally used for transferring text information to be presented on the display of a receiving mobile station, but also for transferring text or data to be interpreted by a receiving mobile station in different ways. Thus, these message based services are also being used as a basis for providing different new types of supplementary services.

An example of the use of a message based service for providing a new type of service is described in International Publication No. WO 97/08906. In WO 97/08906 it is disclosed how messages of a message based service, such as the SMS service of a GSM network, are used for transferring agents from a server to a mobile communication station. The server transmits an SMS message with an agent to a mobile subscriber upon receipt of an e-mail addressed to that subscriber. The agent includes coded information instructing the mobile subscriber, or rather a software implemented client function in a mobile station or its connected computer, how to initiate a particular action with respect to the e-mail, such as retrieving the e-mail from the server in order to display it. Thus, a transferred SMS message and its agent is associated with an e-mail and is used to notify a user of a mobile communication station that an e-mail has been received. In addition to enable a mobile subscriber to read an e-mail, the service provides a number of other options for how the e-mail can be accessed, such as deleting it, forwarding it to a fax or another mobile subscriber etc.

The prior art described above requires that specific software, such as the client function, needs to be designed and included in the mobile station or its connected computer in order to implement the service.

A disadvantage is furthermore that the described agent transferred to the client function occupies space in the payload of the SMS message. Since the SMS message payload typically is limited to 160 characters, this will limit the available space for other kind of information, such as e-mail header information.

SUMMARY OF THE INVENTION

An object of the present invention is to provide a simplified way for a mobile user to access stored digital data over a digital radio communication network.

According to the present invention, this and other objects are achieved by a method, a method of using a data space and a computer-readable medium incorporating the features as defined in the appended claims.

The present invention is based on the idea of using the address data space of short messages for communicating identifying information between an application and a mobile communication station over a digital radio communication network which provide its mobile subscribers with a short message based service. Identifying information is transmitted to a mobile communication station in the originating address data space of a short message. At a later stage, when the mobile station responds to the short message, the received originating address will constitute the destination address and the identifying information will be returned from the mobile station in the destination address data space of the responding short message.

According to a first aspect of the invention, a method at a server is provided in connection with enabling a mobile communication station to access digital data stored by the server. The method includes the steps of: assigning an identifier to a particular piece of stored digital data; initiating transmission of a short message to said mobile communication station by using a short message service provided by said digital radio communication network, wherein said identifier is provided to be included in an originating address data space of said short message; extracting said identifier from a destination address data space of a short message received from said mobile communication station; and identifying to which piece of stored digital data access is requested based on the extracted identifier.

According to a second aspect of the invention, the invention provides method of using a data space, which is designated for addressing information in a short message, for bi-directional communication of identifiers with a mobile communication station. The method uses an originating address data space of a transmitted short message for transmitting an identifier to said mobile communication station, and a destination address data space of a received short message for extracting an identifier received from said mobile communication station.

According to a third aspect, a computer-readable medium is provided which includes computer-executable components for enabling a general purpose computer to perform the basic steps of the method in accordance with the first aspect.

The invention makes use of so-called sub-addressing in a short message node, i.e., the node designed to transmit and route short messages within the digital radio communication network providing the short message based service. Each application which communicates with this node for using the short message service will within the address space of the node have a main account with a unique address. The identifier is transmitted by the application to the mobile communication station by initiating transmission of a short message in which the originating address is composed of the unique main account address followed by a suffix which is equal to the identifier. A receiving mobile communication station may then return the identifier to the application by replying to the received short message, wherein the originating address, i.e., the main account address+suffix, will become the destination address of the responding short message. The short message node will then route the responding short message to the application based on the main account address. Upon reception of the responding short message, the application extracts the suffix from the destination address of the short message. Since the suffix is equal to an identifier, a corresponding piece of stored digital data can be identified by the application.

Preferably, the short message transmitted to the mobile communication station by an application on a server is used for notifying the mobile station's user of the presence of the stored digital data. Typical digital data stored by the server is data received from a network connected to the server, e.g., the Internet.

Advantageously, the server is a mail server and the digital data is an e-mail received by the server from an external network, which e-mail is stored in a mailbox administrated by the mail server.

One of the advantages with the present invention is that a user may respond to received information that identifies a piece of stored data by using a simple reply-function provided by his mobile communication station. The user does not have to take explicit measures for returning this information, such as entering the identifying information manually. Neither does the user have to have a mobile station equipped with specific hardware or software which more or less automatically enables the identifying information to be returned.

Another advantage is that the invention avoids the necessity of communicating identifying information in the payload of the short messages. Instead the data space designated for addressing information in a short message is used for this communication. Thus, the full payload data space, which in a short message has a limited size, such as 140 bytes (corresponding to 160 characters using 7-bit coding) in an SMS message, can be used for transferring user data.

Furthermore, since it is preferred to identify stored digital data based on a combination of a mobile subscription number extracted from the originating address of a responding short message and the extracted identifier, the identifier only has to be unique within a specific storage area, such as a mailbox, and can therefore be defined to have a limited size.

It is to be understood that what is meant by the expression mobile communication station in this document is either a stand-alone RF (Radio Frequency) transceiver having processing capabilities and displaying means, such as a mobile telephone or a hand-held PDA (Personal Digital Assistant), or, a RF transceiver together with any kind of portable or stationary equipment having processing capabilities, such as a portable laptop computer or a stationary personal computer, wherein the RF transceiver is arranged in communication with the portable or stationary equipment.

In the following description of an exemplifying embodiment, the digital radio communications network is exemplified with the GSM network and the message based service with the SMS service provided by the GSM network. However, it should be understood that the invention is not limited to these systems, but can also be applied to other existing or future digital radio communication networks having message based services of a similar kind, such as the digital radio networks GPRS, CDMA, D-AMPS (IS-136), PDC (Pacific Digital Cellular), W-CDMA (Wideband Code Division Multiple Access) and UMTS/IMT-2000.

Furthermore, even though the exemplifying embodiment will refer to the access of e-mail, its is to be understood that the present invention is applicable in connection with access of any kind of digital data stored by a server. Thus, the invention is for example applicable in any situation where there is a need to identify different digital data when pushing it put to a user, wherein the user with his mobile communication station can respond and access the digital data which is of interest.

The above mentioned and further features of, and advantages with, the present invention, will be more fully understood the following description.

BRIEF DESCRIPTION OF THE DRAWINGS

An exemplifying embodiment of the present invention will now be described by way of example with reference to the accompanying drawings, in which.

DETAILED DESCRIPTION OF THE PREFERRED EMBODIMENTS

Figure 1:
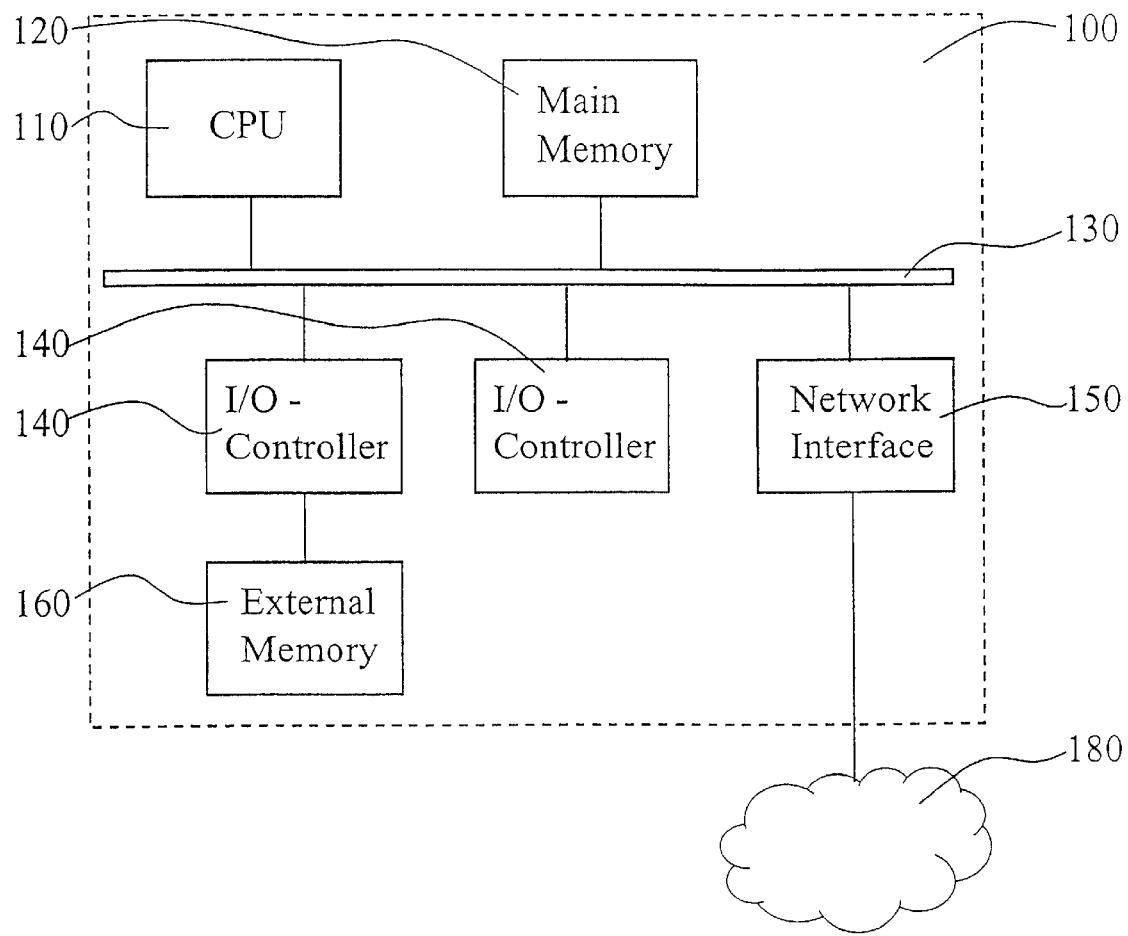
FIG. 1 illustrates a block diagram of a server suitable for practicing the invention.

With reference to FIG. 1, a block diagram of an exemplary system suitable for practicing the invention is shown. The depicted system implements a server 100 which is connected to a digital radio communication network 180 via suitable network interface means 150. Preferably, the digital radio communication network 180 is a GSM network and the network interface means 150 provides hardware circuitry for enabling the server 100 to communicate with an SMS-C (Short Message Service switching Center) (not shown) of the GSM network over a transport protocol such as TCP/IP or X25. The server 100 further includes a central processing unit (CPU) 110, a main memory 120, external memory 160 and one or more input/output- (I/O-) controllers 140 for connecting different peripheral devices to the server 100. As depicted in FIG. 1, the above-mentioned elements are together with the network interface means connected to a system bus 130.

The overall functioning of the server 100 is controlled by the CPU 110. The CPU operates under the control of executed computer program instructions that are stored in main memory 120 or in external memory 160. By executing these program instructions, the CPU 110 will control the overall server 100 to perform at least the functionality of the present invention that is located in the server. The CPU 110 controls and communicates with the various elements of the server by means of the system bus 130, which system bus has any of several types of bus structures including a memory bus, a peripheral bus, and a local bus implemented by any of a variety of bus architectures.

The main memory 120 is a computer-readable storage device, typically implemented by read only memory (ROM) and/or random access memory (RAM), which provide the CPU with fast access to computer-readable program instructions and information data stored by the main memory. The external memory 160 is any computer-readable media that provides a non-volatile storage of computer-readable program instructions and information data and is typically implemented by a magnetic or optical disk which either is stationary or removable and which is connected to the I/O-controller via appropriate disk drive circuitry. It should be appreciated that the server 100 may include, or be connected to, various other computer-readable devices or media, which are accessible by the CPU 110, and which are capable of storing computer program instructions and/or information data.

Figure 2:
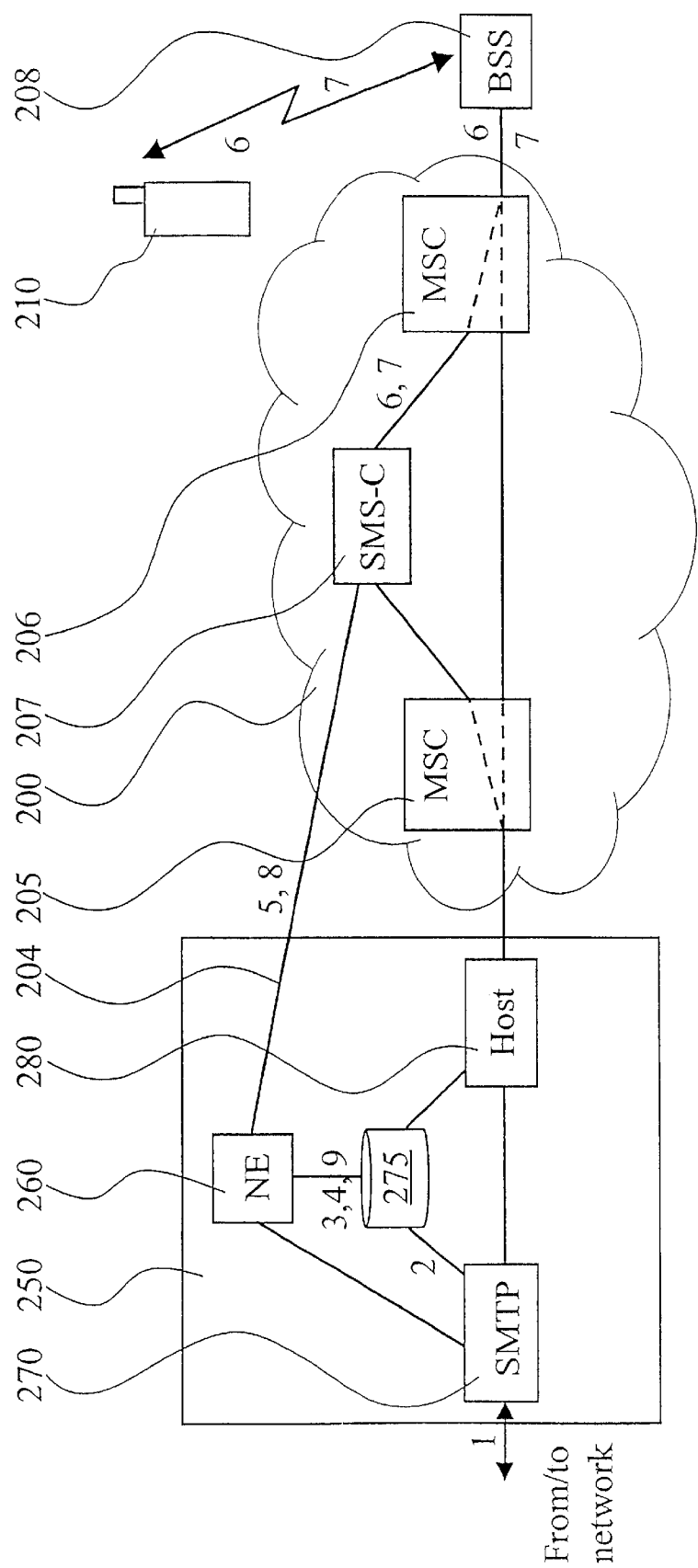
FIG. 2 illustrates a server connected to a digital radio communication network and operating in accordance with the exemplifying embodiment.

With reference to FIG. 2 an embodiment of the invention will know be described in greater detail. In FIG. 2 the digital radio communication network is exemplified with a GSM mobile communication network 200 (Global System for Mobile communication). Two of the MSC switches (Mobile service Switching Center) included in the GSM network are shown, MSC 205 and MSC 206. The MSC 206 communicates with a mobile communication station 210, here exemplified with a mobile telephone, via a Base Station System, BSS, 208 and a GPRS or GSM radio interface. The MSC switch 206 manages the traffic to/from the mobile communication station 210, which may be a speech connection in progress, the transfer of a short message, such as an SMS (Short Message Service) message, or some other GSM traffic. The SMS messages terminating in, and originating from, the mobile communication station 210 are switched in an SMS center (SMS-C) 207. This SMS center routes SMS messages to the right recipients in accordance with commonly known techniques. The SMS messages transferred between the BSS 208 and the mobile communication station 210 are either transferred over GSM signaling channels or on GPRS traffic channels. The signaling between the SMS-C 207 and the BSS 208 and the transfer of SMS messages between the BSS 208 and any specific MSC in the GSM network 200 is all in accordance with the state of the art.

In FIG. 2 a server 250 is arranged to be operatively connected to the GSM network 200 and to provide different services to users of mobile communication stations 210 via the GSM network. The server is connected to the MSC 205 which manages GSM traffic between the server and the GSM network. The server 250 furthermore has access to a packet data connection 204 which connects it with the SMS-C 207. An exemplary architecture of the server 250 has previously been described with reference to FIG. 1. Advantageously, the implementation of the server 250 is based on the Internet Cellular Smart Access platform (ICSA, which is a trademark of Microsoft Corporation). The ICSA platform is commercially available from Microsoft Corporation. ICSA is a system platform which enable an operator to provide a number of mobile services to its subscribers. For example, the services of sending and receiving e-mails using a mobile communication station.

One basic functionality of the ICSA platform is the capability of initiating the transmission of SMS (Short Message Service) messages which includes notifications relating to e-mails temporary stored by the ICSA platform. When a mail server included in the ICSA platform receives an e-mail addressed to a specific user, an SMS message with a notification identifying the e-mail is transmitted to a mobile communication station 210 associated with the e-mail address. The SMS message is transmitted via a SMS-C 207 in a GSM network 200. Using the information of the notification the user of the mobile communication station 208 can retrieve the e-mail stored by the ICSA system.

The unit responsible in the ICSA platform for transmitting notifications is called the Notification Engine (NE) 260. The NE 260 communicates with the SMS-C 207 over a packet data connection 204 which interconnects the NE 260 and the SMS-C 207. The communication follows a communication protocol used by the SMS-C 207.

Since the server 250 implements an embodiment of the present invention that is based on the above described ICSA platform, the server 250 is in FIG. 2 illustrated as including the above-mentioned NE 260, but also a database 275 included in an ICSA platform for storing e-mails, SMS messages, subscriber information etc. The server 250 further includes a mail server host process 270, such as a process operating in accordance with the SMTP protocol (Simple Mail Transfer Protocol) or any other similar protocol for transferring e-mails between mail server hosts over a transport service such as TCP (Transmission Control Protocol) or X.25. Preferably, the server 250 also includes a mail delivery process 280, such as a process operating in accordance with the POP3 (Post Office Protocol, version 3) or IMAP4 (Internet Message Access Protocol, version 4) protocols or any other similar protocol used for delivering e-mails stored by a mail server host to a mail client. The mail server host process 270 and the mail delivery process 280 is preferably implemented to be executed by hardware equivalent with, or appropriate hardware connected to, the hardware of the ICSA platform.

It should be noted that the present invention is applicable for implementation and use in connection with any kind of application which communicates with an SMS-C of any manufacturer over a packet data connection in accordance with an interface protocol provided by the SMS-C. In general, different SMS-C:s of different manufacturer is designed to provide the same functionality via their interface protocols. However, different kinds of SMS-C:s may be designed to use slightly different syntax in their interfaces when providing the same functionality. An application of this kind arranged to communicate with an SMS-C is called an External Short Message Entity (ESME). The Notification Engine 260 in the embodiment of FIG. 2 is one example of such an ESME.

An exemplifying mode of operation of the overall system in FIG. 2, which includes the operation in accordance with an embodiment of the present invention, will now be described. For ease of understanding the description includes reference numerals within brackets which refer to FIG. 2 and which indicate the elements involved in a particular information/data flow.

When the SMTP process 270 receives (1) an e-mail message from a network (not shown) to which the server 250 is connected, the received e-mail message is stored (2) in the database 275 at a position associated with a specific mailbox. The mailbox corresponds to the address of the received e-mail message and occupies a storage area in the database. The mailbox, and thus the storage area, is allocated to a user via an e-mail service subscription that the user has requested the operator of the server 250 to connect to a mobile subscription of the user. Upon reception of the new e-mail, the NE 260 derives (3) the mobile subscription number, i.e., the MSISDN (Mobile Station Integrated Services Digital Network) number, corresponding to the e-mail address by means of a look-up table stored in the database 275. Alternatively, the mobile subscription number is extracted directly from the e-mail address if the e-mail address is constructed with the MSISDN as a prefix to the network address of the server 250. The NE 260 furthermore creates a unique number which is unique within the specific mailbox and which identifies the e-mail message among all messages stored in the specific mailbox. This unique number, which is associated with the received e-mail, is also stored (4) in the database 275.

Optionally, the server 250 includes a POP3 mail delivery process 280 which administers mailboxes and interacts with the SMTP process in accordance with techniques known to the person skilled in the art. If such a POP3 process, or its equivalent, is included in the server, its normal generation of unique identifiers could be used by the present invention. However, even if a POP3 process is present, it is preferably still the responsibility of the NE to generate the unique numbers. The reason for this is that the format of the unique numbers will then not limit the implementation of the invention.

Irrespective of whether the unique number is created by the NE 260 or originating from a modified POP3 process 280, the NE will initiate the transmission of an SMS message addressed to the mobile subscription number which was derived from the e-mail address. The NE will use the interface protocol defined by the SMS-C 207 for submitting (5) a request over a TCP/IP connection 204 to the SMS-C node 207, requesting the SMS-C to generate a mobile terminated SMS message. Irrespective of which exact syntax this interface protocol uses, the parameters to be incorporated include an originating address of the SMS message, a destination address of the SMS message and a text string to be transferred by the SMS message payload and visually displayed to a receiving user at the destination address. The NE 260 is an ESME, i.e., an SMS-C application, and as such has a defined account number which is unique within the SMS-C address space. The generated unique number is added as a suffix to the account number and the resulting number is used as the originating address in the request for transmission of an SMS message. The destination address of the request is supplied with the derived MSISDN number and the text string with information to be displayed to the user of the mobile communication station, in this embodiment e-mail header information.

Upon receiving the request, the SMS-C 207 creates an SMS message with the provided parameters and routes (6) the SMS message to the mobile communication station 210 in accordance with the MSISDN number. As the user of the mobile communication station 210 reads the text string provided by the received SMS message, he will notice that the text consists of an e-mail header and will thus be notified that the e-mail server 250 has received a new e-mail and stored it in the user's mailbox.

The user may now access the stored e-mail by using the reply-function of the mobile communication station 210 for replying to the received SMS message. This operation results in that the originating address of the received SMS message will be used as the destination address of the responding SMS message. The responding SMS message will have an originating address corresponding to the MSISDN of the mobile communication station 210 and possibly a text string payload which optionally is inputted by the user using a keyboard or a keypad. Thus, by replying to the received SMS message the user will request (7) the SMS-C 207 to transmit a responding SMS message by providing the SMS-C with the above-mentioned parameters. From the destination address supplied in this request the SMS-C concludes that the created SMS message should be routed to the application that has an account number which corresponds to the destination address. The additional suffix will not effect this operation, since the destination address formed by the account number+suffix will be treated by the SMS-C as being within the address range of the account number.

The SMS-C will now transmit (8) the generated responding SMS message over the packet data connection 204 to the application, i.e., the NE 260. Upon reception of the responding SMS message, the NE extracts the MSISDN from the originating address of the SMS message and the unique number from the suffix of the destination address. With the MSISDN the NE identifies (9) a mailbox in the database 275 and with the unique number a specific e-mail in that mailbox.

Thus, the user of the mobile communication station 210 has received an SMS message notifying the user of a new received e-mail which has been stored by the mail server 250. By using the reply-function of the mobile communication station, the user has obtained access to this new e-mail.

The NE 260 may be configured to perform a number of actions in response to the user's request to access the e-mail. Examples of such actions are:

transmitting the accessed e-mail in a number of SMS messages to the mobile station over the packet data connection 204;

creating a responding e-mail to the one accessed and requesting the SMTP process 270 to transmit this responding e-mail to the originator of the accessed e-mail;

forwarding the stored e-mail to another mobile subscriber; etc.

What action the NE should perform could either be predefined, or it could be controlled by the user by, e.g., including a corresponding control character in the user text part of the responding SMS message.

To give an illustrative example of the overall system operation in accordance with an embodiment of the invention, a typical use case with assigned parameter values will now be presented.

Assume that a user named Peter Smith has a mobile subscription with an operator known as Compolitan. Peter's MSISDN is in accordance with the national numbering plan 46708123456. Peter has also agreed with Compolitan to subscribe to a mobile e-mail service. Compolitan has therefore given Peter an e-mail account on its mail server and has associated Peter's MSISDN with that e-mail account. Furthermore, assume that Adam, a friend of Peter, wants to transmit an e-mail message to Peter. Depending on Compolitan's mail addressing scheme, Adam will address his e-mail to peter.smith@compolitan.se or to 46708123456@compolitan.se. When Adam has sent his e-mail, the following happens:

1. Peter's mailbox, which is associated with his MSISDN 46708123456, on Compolitan's server 250 receives a new e-mail.

From:<adam@microsoft.com>

Subject:<Tonight>

Body:<Will you be at home?/Adam>

2. The NE 260 generates a number, for example number 155, which is unique within Peter's mailbox and which identifies the received e-mail.

3. The NE adds the unique number 155 as a suffix to the application account number which is assigned to the NE 260 by the SMS-C 207. If the account number is 332, the addition of the suffix 155 will generate the number 332155. When the NE submits the request to the SMS-C to transmit a mobile terminated SMS message, the parameter fields of the request will have the following content:

SMS originating address data: 332115

SMS destination address data: 46708123456

SMS body text:<adam@microsoft.com; Tonight; Will you be at home?/Adam>

4. The SMS-C 207 generates the specified SMS message, after which the SMS message is transmitted and routed to the mobile communication station 210 in accordance with the MSISDN of the destination address data field of the SMS message.

5. Peter, the user of the mobile communication station 210, receives the SMS message and chooses to read it. The payload of the SMS message, i.e., its conveyed text data, will then be displayed:

<adam@microsoft.com; Tonight; Will you be at home?/Adam>

If the mobile communication station is capable of interpreting the syntax of the received text data, it could be displayed as:

From:<adam@microsoft.com>

Subject:<Tonight>

Body:<Will you be at home?/Adam>

6. Peter decides to make a reply and therefore selects the reply function on the mobile communication station and then enters the replying text. When the station submits the request to the SMS-C to transmit a responding mobile originating SMS message, the parameter fields of the request will have the following content:

SMS originating address data: 46708123456

SMS destination address data: 332115

SMS body text:<Yes, but not until 9pm>

7. The SMS-C 207 generates the specified SMS message. From the destination address data it is concluded that the destination is an application having the account number 332. Thus, the unique number 155, indirectly returned by the mobile communication station when responding to a received SMS message, is from the SMSC's point of view superfluous information, since it is treated as being within the address range of account 332. However, this returned unique number is part of the destination address data and will be included in the destination address data of the generated SMS message transmitted to application having account number 332.

8. The NE 260, being the application that has account number 332 on the SMS-C, receives the mobile originating SMS message. The NE extracts the MSISDN 46708123456 from the originating address data space of the SMS message, thus enabling it to identify the corresponding mailbox in the database 275. The NE furthermore extracts the unique number 155 by reading the suffix attached to its account number in the destination address data space. With this unique identifier the corresponding e-mail stored in the specific mailbox is identified.

9. The NE 260 now creates an e-mail reply to the identified e-mail. The body of the replying e-mail is extracted from the text part of the received mobile originating SMS message and the SMTP process is requested to transmit the following e-mail:

From:<peter.smith@compolitan.se>

Subject:<RE:Tonight>

Body:<Yes,but not until 9pm>

Thus, Peter, the user of the mobile communication station, has successfully created and transmitted an e-mail reply in response to an e-mail addressed to him on,e.g., the Internet without having an Internet access and while still being mobile.

Although the invention has been described with reference to a specific exemplifying embodiment based on a GSM system providing an SMS service, the described embodiment is not intended to limit the scope of the invention, as defined by the appended claims. Instead, the present invention is well suited for any digital radio communication networking that provides a message based service to its connected wireless user.

Thus, many different alterations, modifications and the like, within the scope of the appended claims, will become apparent for those skilled in the art.

What is claimed is:

1. A method at a server in connection with providing a mobile communication station with access to stored digital data, said server and said mobile communication station being operatively connected to a digital radio communication network, the method comprising:

assigning an identifier to a particular piece of stored digital data;

initiating transmission of a short message to said mobile communication station by using a short message service provided by said digital radio communication network, wherein said identifier is provided to be included in an originating address data space of said short message;

extracting said identifier from a destination address data space of a short message received from said mobile communication station; and identifying to which piece of stored digital data access is requested based on the extracted identifier.

2. The method as claimed in claim 1, wherein said initiating act includes submitting a request to a node of said digital radio communication network to transmit said short message to said mobile communication station, wherein said identifier is combined with an address of the server and submitted in said request as an originating address.

3. The method as claimed in claim 2, wherein said identifier is combined with the server address by adding the identifier as a suffix to the server address.

4. The method as claimed in claim 1, further comprising:

receiving digitally coded information from an external network; and storing said information as said piece of digital data.

5. The method as claimed in claim 1, wherein said piece of digital data is stored in a storage area allocated to a service subscription with an operator of the server, said service subscription being associated with said mobile communication station, wherein said identifier is unique with respect to said storage area.

6. The method as claimed in claim 1, further comprising:

extracting a mobile subscription number, which is associated with said mobile communication station in accordance with a telecommunications numbering plan, from said originating address data space of the short message received by the server, wherein said identifying step is performed based on a combination of said mobile subscription number and said identifier.

7. The method as claimed in claim 6, wherein said identifying act includes:

identifying a defined storage area to which the extracted mobile subscription is associated; and identifying said particular digital data, which is stored in said defined storage area, using the extracted identifier.

8. The method as claimed in claim 1, wherein said server is a mail server and said digital data are e-mail.

9. The method as claimed in claim 5, wherein said server is a mail server and said storage are is a mailbox administrated by said mail server.

10. A computer readable medium storing computer program code means for performing the method as claimed in claim 1 when said computer program code means is run on a computer.

11. A method of using a data space designated for addressing information in a short message, the short message being of the kind provided by a short message service in a digital radio communication network, for bi-directional communication of identifiers with a mobile communication station, the method comprising:

transmitting an identifier in an originating address data space of a short message transmitted to said mobile communication station; and extracting an identifier from a destination address data space of a short message received from said mobile communication station.

12. The method as claimed in claim 11, wherein said originating address data space includes the transmitted identifier as a suffix to an originating address and said destination address data space includes the received identifier as a suffix to a destination address.

13. The method as claimed in claim 11, wherein the transmitted identifier notifies said mobile communication station of the presence of a particular piece of stored digital data.

14. The method as claimed in claim 11, wherein the received identifier identifies a particular piece of digital data to which said mobile communication station is to be provided with access.

15. The method as claimed in claim 11, wherein the received identifier is identical to a previously transmitted identifier.

16. The method as claimed in claim 13, wherein said particular piece of digital data is stored in a storage area associated with a mobile subscription number which in turn is associated with said mobile communication station in accordance with a tele-communication communications numbering plan, wherein said transmitted identifier is associated with said particular piece of digital data and unique within said storage area.

17. The method as claimed 16, wherein said particular piece of digital data is an e-mail and said storage area is a mailbox for storing received e-mails.

18. A computer-readable medium having computer-executable components comprising:

a component for assigning an identifier to a piece of stored digital data;

a component for deriving an originating address which includes at least said identifier; and a component for requesting a short message service provided by a digital radio communication network to transmit a short message with said originating address in its originating address data space, thereby notifying the presence of said piece of stored digital data to a recipient of said short message;

a component for extracting an identifier from the destination address data space of a received short message; and a component for identifying said piece of stored digital data based on the extracted identifier, thereby identifying the piece of digital data to which an originator of said received short message requests access.

19. The computer-readable medium as claimed in claim 18, wherein the derived originating address in addition to said identifier includes an address to a server, which server is operatively connected to said digital radio communication network and which server stores said piece of digital data.

20. The computer-readable medium as claimed in claimed 18, further comprising:

a component for extracting a subscription number associated with said originator from said originating address data space of said received short message, wherein said component identifying said piece of stored digital data first identifies a storage area associated with said subscription number within which storage area said piece of digital data is stored.

* * * * *

UNITED STATES PATENT AND TRADEMARK OFFICE
CERTIFICATE OF CORRECTION

PATENT NO.    : 6,738,636 B2        Page 1 of 2
DATED         : May 18, 2004
INVENTOR(S)   : Aleksander Lielbriedis It is certified that error appears in the above-identified patent and that said Letters Patent is hereby corrected as shown below:

Title page,
Item [56], References Cited, FOREIGN PATENT DOCUMENTS, please add the following:

|    |             |         |      |
|----|-------------|---------|------|
| -- | WO 97/08906 | 3/1997  | PCT  |
|    | WO 98/30051 | 7/1998  | PCT  |
|    | WO 98/58476 | 12/1998 | PCT  |
|    | WO 99/12364 | 3/1999  | PCT  |
|    | WO 99/52247 | 10/1999 | PCT  |
|    | WO 99/63742 | 12/1999 | PCT  |
|    | WO 00/02403 | 1/2000  | PCT  |
|    | WO 00/35214 | 6/2000  | PCT--|

Column 1,
Line 48, after "In addition to" change "enable" to -- enabling --
Line 60, change "kind of information" to -- kinds of information --

Column 2,
Line 53, change "message service will" to -- message service will, --
Line 54, change "node" to -- node, --

Column 3,
Line 65, change "is for example" to -- is, for example, --
Line 67, change "it put to a user," to -- it out to a user, --

Column 4,
Line 5, before "the following description." insert -- from --
Line 67, change "know" to -- now --

Column 5,
Line 37, before "an operator" change "enable" to -- enables --
Line 44, change "temporary" to -- temporarily --
Line 51, change "notification" to -- notification, --

Column 6,
Line 19, change "SMS-C:s" to -- SMS-C's --
Line 19, change "manufacturer is" to -- manufacturers are --
Line 21, change "SMS-C:s" to -- SMS-C's --

Column 7,
Line 49, before "this operation," change "effect" to -- affect --

Column 10,
Line 50, change "storage are is" to -- storage area is --

UNITED STATES PATENT AND TRADEMARK OFFICE
CERTIFICATE OF CORRECTION

PATENT NO. : 6,738,636 B2
DATED : May 18, 2004
INVENTOR(S) : Aleksander Lielbriedis It is certified that error appears in the above-identified patent and that said Letters Patent is hereby corrected as shown below:

Column 11,
Line 21, change "tele-communication communications" to
-- telecommunications --
Line 23, before "unique" insert -- is --

Column 12,
Line 21, after "claimed in" change "claimed" to -- claim --

Signed and Sealed this

Twelfth Day of April, 2005

JON W. DUDAS
*Director of the United States Patent and Trademark Office*